Feb. 22, 1955 — N. B. HENRY — 2,702,659
LIQUID LEVEL CONTROLLED NOZZLE FOR FLUID PUMPING AND DISPENSING MACHINES
Filed Aug. 23, 1950 — 2 Sheets-Sheet 1

INVENTOR.
NELSON B. HENRY
BY
ATTORNEY

Feb. 22, 1955 N. B. HENRY 2,702,659
LIQUID LEVEL CONTROLLED NOZZLE FOR FLUID
PUMPING AND DISPENSING MACHINES
Filed Aug. 23, 1950 2 Sheets-Sheet 2

*INVENTOR.*
NELSON B. HENRY
BY
ATTORNEY

United States Patent Office 2,702,659
Patented Feb. 22, 1955

2,702,659

LIQUID LEVEL CONTROLLED NOZZLE FOR FLUID PUMPING AND DISPENSING MACHINES

Nelson B. Henry, Atlanta, Ga., assignor to Robert Feldser, Atlanta, Ga.

Application August 23, 1950, Serial No. 180,936

9 Claims. (Cl. 226—127)

This invention relates to a nozzle and more particularly to a nozzle for fluid pumping and dispensing machines which will automatically cut off when the level of the liquid passing into the container reaches a predetermined level on the nozzle. Also, the nozzle of my invention is suitable for filling containers with liquid through a bung hole or filling tube, and for filling closed containers having but a single opening which serves both to fill the tank with liquid and to let out the air.

Though I do not wish to limit my invention to gasoline nozzles for filling automobile fuel tanks, it is particularly well adapted for that use and my drawing will illustrate a nozzle designed for such tanks. It is often desirable in automobile service stations to provide a nozzle on the gasoline dispenser which will stop the flow of gasoline when the tank is filled so that there is no danger of the gasoline spilling on the fender of a car and on the ground.

Accordingly, it is an object of my invention to provide a filling nozzle which will shut off either when the operator removes his hand from the valve lever, or automatically when the tank is full.

Another object is to provide a filling nozzle which will shut off automatically when the tank is full and which will function equally as well when the valve has been opened only part way as when the valve is opened completely.

A further object of the invention is to provide a filling nozzle in which the valve is controlled by an operating lever, one end of which may be latched in various positions, and yet will not interfere with the automatic operation of the valve.

A further object of the invention is to provide a filling nozzle which will automatically cut off when the liquid in a container reaches a predetermined level on the nozzle.

A further object of the invention is to provide an automatic cut off nozzle which will function equally well at reduced rates of flow.

A further object of the invention is to provide a nozzle of the class described having a vacuum actuated cut off valve which will more effectively utilize the surface tension of the liquid to cut off the valve.

A further object of the invention is to provide a nozzle which will deliver accurately a predetermined quantity of liquid and which will function equally as well when automatically operated as when manually operated.

Other and further objects and advantages of my invention will be apparent from the following description taken in connection with the accompanying drawing in which like characters of reference designate corresponding parts throughout the several views, and wherein.

Figure 1:
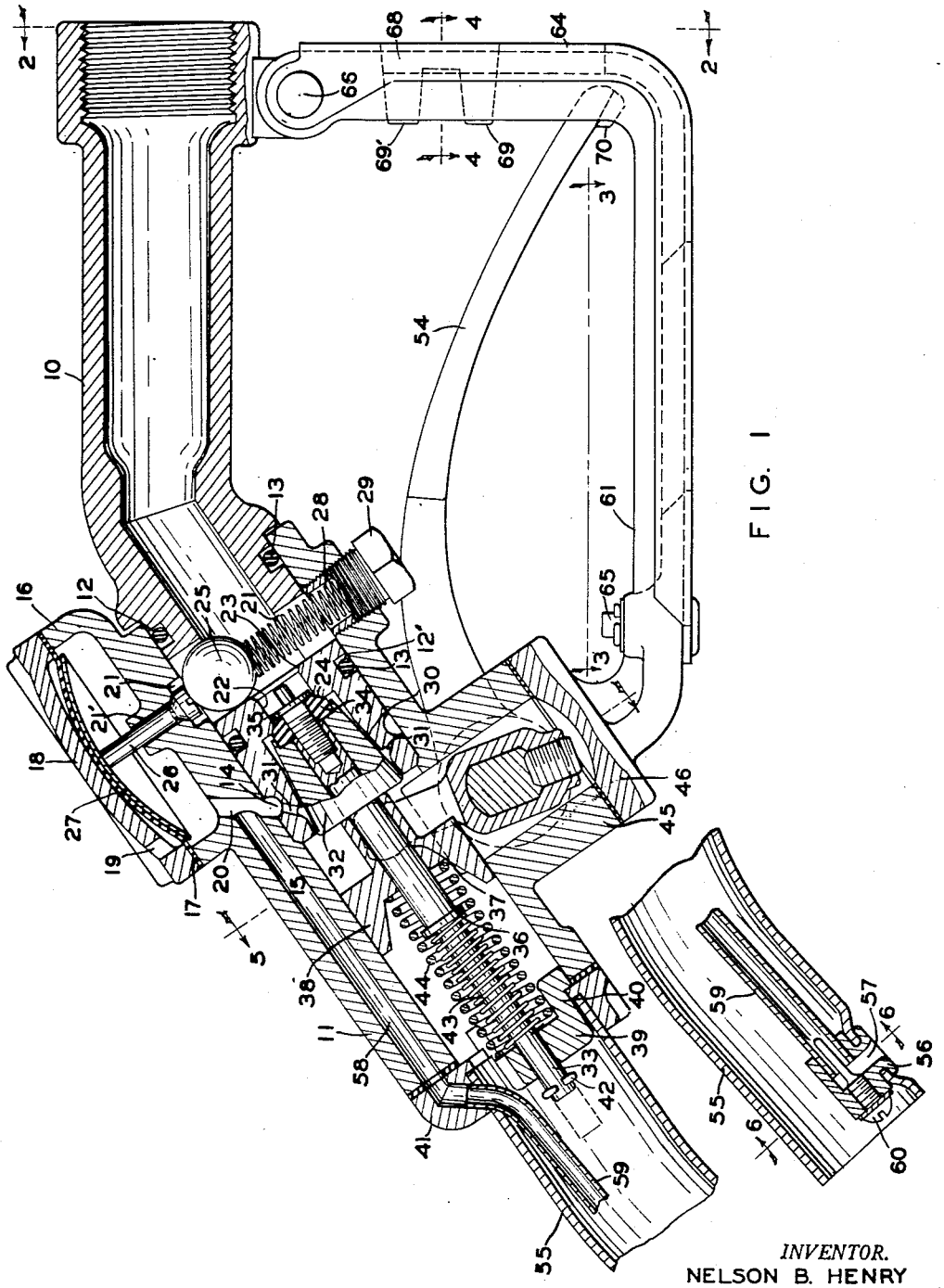
Fig. 1 is a cross-sectional side view of a filling nozzle embodying my invention. The parts are shown in their position before the nozzle is actuated to deliver fluid.

In the embodiment chosen for illustration, numeral 10 denotes generally an elongated cylindrical casing threaded internally at one end to receive a flexible hose (not shown) and curving down at the other end, as shown in Fig. 1, and inserted into a larger, somewhat irregular, cylindrically shaped valve housing 11. Annular grooves 12 and 12' are provided on the periphery of the inserted portion of casing 10 and contain packing 13 and 13' therein. Below grooves 12 and 12' on casing 10 and somewhat adjacent the last mentioned end is a concaved annular groove 14, the function of which will be described later.

The inserted end of casing 10 is beveled and abuts a complementary shoulder 15 within housing 11 which limits the distance which casing 10 may be inserted.

On the outer periphery of housing 11, on a section adjacent the inserted portion of casing 10 is a tangential cylindrical vacuum cup 16 formed integrally with housing 11 and which has an upstanding peripheral edge or rim machine to receive a flexible diaphragm 17. Cap 18 is provided to enclose diaphragm 17 and is also cup-shaped, having a peripheral edge or rim identical with the rim of cup 16 and cooperates with this surface to retain diaphragm 17 therebetween. Bolts (not shown) pass through flanged areas on cap 18 and into similar areas in cup 16 to fix the position of the cap. Aperture 19 is provided in cap 18 so that the dome formed between diaphragm 17 and cap 18 may always be at atmospheric pressure and a channel 20 is provided to connect annular groove 14 with the inside of cup 16.

A drill is next passed through housing 11 and casing 10 opposite cup 16 but on an extension of the center line of cup 16 and cap 18 and it extends into but not through the area on housing 11 adjacent cup 16 to provide hole 21. A smaller drill is substituted for the original drill and is passed through the remainder of housing 11 and cup 16 to form hole 21'.

As seen in Fig. 1, an internal peripheral flange 22 with valve seat 23 is formed on the inner wall of casing 10 adjacent and below drill hole 20. An identical valve seat 24 at the other end of flange 22 is formed parallel to valve seat 23.

Ball check 25 is provided in an enlarged section of the hole 21' as shown in Fig. 1 and is of such a size that it will seat on valve seat 23. A cylindrical plunger 26 is provided in hole 21', one end of which rides on a parabolic metal disc 27 inserted below diaphragm 17, and the other end of which has an enlarged head which rides on ball 25. A light spring 28, retained in place by a threaded plug 29 inserted in the drill hole 21 on the lower side of housing 11, residually urges ball 25 against plunger 26. Therefore, normally, plunger 26, because of the action of spring 28, will be urged into a position where diaphragm 17 rests against the inner wall of cap 18, and ball check 25 will rest in a position at one side of valve seat 23, as shown in Fig. 1.

Between the discharge end of casing 10 and flange 22, the passage in casing 10 spreads out into a hollow cone 30 and a plurality of channels 31 connect groove 14 with this hollow cone at such an angle that a partial vacuum may be created within the groove 14 when liquid is delivered through the hollow cone.

A plug or valve 32 in the shape of a truncated cone which conforms in size and shape to hollow cone 30 is mounted on one end of shaft 33 positioned axially in the center of housing 11, and a conventional washer 34, conforming in shape to valve seat 24 and being made of material which will not be deteriorated by the liquid within the nozzle, is fixed to the small end of plug 32 by retainer member 35 which threadably engages the end of shaft 33. The free end of retainer member 35 extends through the orifice formed by flange 32 to a point adjacent valve seat 23 and is provided to engage ball 25 when both ball 25 and valve 32 are seated on their respective valve seats. The lower section of shaft 33 is of smaller diameter than the upper section of the shaft, and flange 36 located substantially midway between the ends of the shaft separates the two sections.

Journaled on the upper section of shaft 33 between plug 32 and flange 36 is a square sleeve 37 having four fins 38 radiating at right angles from its lower section to slidably fix the sleeve with relation to both shaft 33 and housing 11. A second sleeve 39 is journaled on the smaller section of shaft 33 and three equally spaced ribs 40 radiate toward plug 32 and outward to be retained in place by an end member 41 which is fixed by screws (not shown) to the free end of housing 11. A keeper 42 passes through a transverse aperture in the lower end of shaft 33 and thus slidably fixes sleeve 39 between flange 36 and itself. A light helical spring 43 is wound about shaft 33 between sleeve 39 and flange 36 and residually urges washer 34 against valve seat 24, and a stronger helical spring 44, extending over spring 43, between sleeve 39 and sleeve 37, residually urges sleeve 37 and sleeve 39 apart causing sleeve 37 to abut plug 32.

As shown in Fig. 1, a lever housing 45 extends down at right angles from housing 11, being integral therewith, and a hollowed section is provided in housing 45 which communicates with the interior of housing 11. Head 46 is provided to seal the open end of housing 45 and is retained in place by bolts (not shown).

Figure 5:
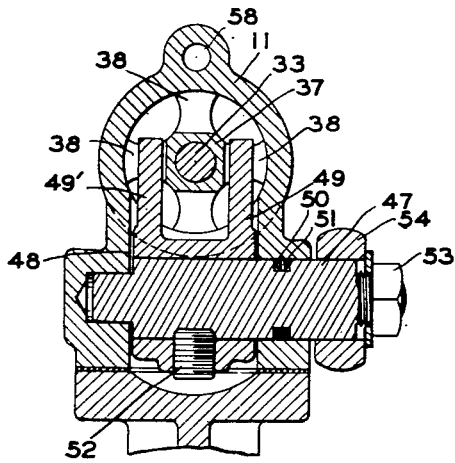
Fig. 5 is a cross-sectional view taken along line 5—5 of Fig. 1.

Journaled between transversely aligned apertures located centrally of housing 45 and extending outwardly of one side of housing 45 is shaft 47, as shown in Fig. 5. Mounted on a substantially squared section of shaft 47 and within housing 45 is a somewhat U-shaped camming member 48, arms 49 and 49' of which extend inwardly on opposite sides of sleeve 37 to engage respectively, a transversely opposed pair of the fins 38. The space provided by sleeve 37 between fins 38 and plug 32 is substantially the width of arms 49 and 49' and therefore these arms also engage the base of plug 32 to provide camming action therefor. An annular groove 50 on the periphery of shaft 47 contains packing 51 to form a seal between the atmosphere and the hollow section of housing 45. A set screw 52 retains cam 48 in place on shaft 47, and nut 53 retains a lever 54 which is mounted on the outer squared end portion of shaft 47.

Lever 54 extends at right angles to shaft 47 and curves under casing 10 so that the central and free end areas thereof are substantially parallel to and under casing 10. As illustrated in Fig. 1, lever 54 is arcuate so that the fingers of a person holding the nozzle will engage the lever comfortably.

Figure 6:
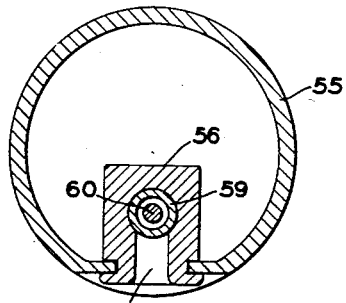
Fig. 6 is a cross-sectional view taken along line 6—6 of Fig. 1.

Pressed within end member 41 is one end of a curved pipe 55 which forms the nozzle from which liquid is dispensed. Adjacent the free end of pipe 55 and within aperture on the periphery thereof is a breather member 56, as illustrated in Figs. 1 and 6. Member 56 is positioned so that its major body portion is within pipe 55. An L-shaped passageway 57 within member 56 extends inwardly and upwardly as shown in Fig. 1.

Channel 58, formed in the wall of housing 11, runs lengthwise to connect channel 14 with the open end of a tube 59 held in end member 41. Tube 59 extends down into pipe 55 to connect with passageway 57 in breather member 56. Screw 60 threadably engages the section of breather member 56 opposite tube 59 and is provided with a smooth cylindrical extension which extends into but does not close the mouth of tube 59, for a purpose to be described later.

Figure 2:
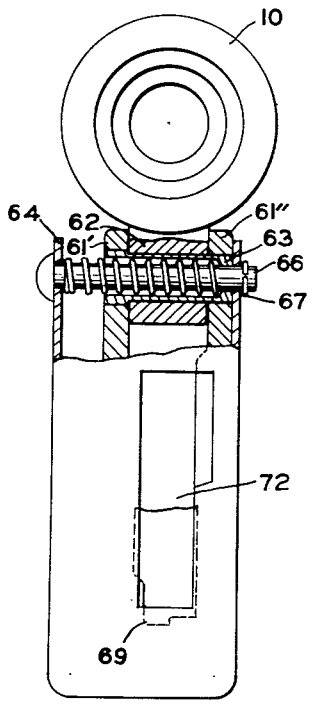
Fig. 2 is a partially broken end view taken along line 2—2 of Fig. 1.
Figure 3:
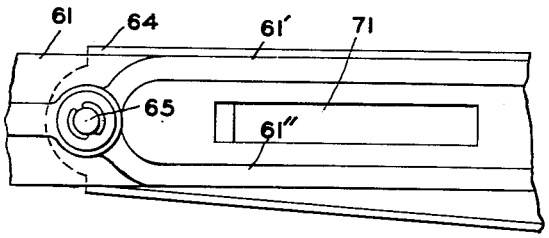
Fig. 3 is a cross-sectional view taken along line 3—3 of Fig. 1.

A lever guard 61 extends in an L-shaped form from the exterior of casing 10 around lever 54 and is integrally joined to head 46. Flange 62 on casing 10 supports the other end of guard 61 and is provided with a sleeve 63 which fixes the aforesaid parts in the manner shown in Fig. 2. An L-shaped latch supporting member 64 conforming in shape to guard 61 is pivotally mounted on guard 61 at a point adjacent head 46 and loosely encases the back and side portions of the guard. As seen in Figs. 1 and 3, pin 65 passes through an extended section of member 64 and through guard 61 to provide the pivotal action described above. Immediately after pin 65, guard 61 separates into two spaced depending arms 61' and 61" which extend the remaining distance to abut opposite sides of flange 62.

A second pin 66 is fixed transversely in respective apertures in opposed sections of the free end of member 64 and is slidably journaled within sleeve 63. A helical spring 67 is wound around pin 66 to provide spring tension between the inside end section of sleeve 63 and the opposite inside portion of member 64 in the manner shown in Fig. 2.

Figure 4:
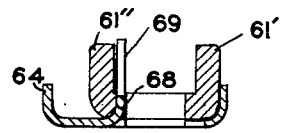
Fig. 4 is a cross-sectional view taken along line 4—4 of Fig. 1.

As shown in Figs. 1 and 4, a latch 68 extends inwardly from the back of member 64 through the spaced arms 61' and 61" to a position for engagement with the free end of lever 54. Latch 68 has two latch arms 69 and 69' which may selectively engage a shoulder 70 on the free end of lever 54 when member 64 is rotated against the pressure of spring 67 to position the selected arm 69 or 69' below the lever. Rectangular slots 71 and 72 on member 64 are provided as shown in Figs. 2 and 3 so that the nozzle may be placed on a supporting hook (not shown) when it is not in use. It is to be remembered that when arms 69, 69' are engaging the shoulder 70, slots 71 and 72 will be partially closed by one of the spaced arms 61', 61"; therefore, it is impossible to place the nozzle on its supporting hook unless lever 54 is in its normal closed position.

The operation of the nozzle at this point should be apparent; liquid under pressure is introduced through casing 10 to plug 32, and when the plug is open, the liquid is delivered through the mouth or open end of pipe 55 and into the tank to be filled. Plug 32 is normally held against its seat by the action of both springs 43 and 44, thus preventing the liquid from discharging. It should be noted that spring 43 is much lighter than spring 44, and that spring 43 alone will not withstand the hydraulic pressure exerted against washer 34. Spring 44, on the other hand, is sufficiently strong acting alone to withstand the pressure. Therefore, to discharge the liquid from the nozzle, lever 54 is lifted manually which rotates shaft 47 and moves the arms of camming member 48 against fins 38 thus compressing spring 44 and removing sleeve 37 from its abutting position against plug 32. With only the pressure of light spring 43 to maintain plug 32 and washer 34 in a position blocking the flow of liquid, the plug and washer are forced from their seat and liquid passes around plug 32, around fins 38 and ribs 40, and out of pipe 55.

By manual operation of member 64, latch 68 may be positioned to hold lever 54 in either of two positions as described above and thus affords two rates of discharge. It is to be understood that the greater the lift of lever 54 the further washer 34 is forced from its seat and a correspondingly larger volume of liquid is discharged.

Ball 25 which functions as a check valve serves to stop the discharge of liquid when the liquid level in the tank closes aperture 57 and is actuated in the following manner. The liquid passing through the orifice in flange 22 and out through cone 30 creates a partial vacuum in annular groove 14 because of channels 31, thus causing air to be drawn through aperture 57, up tube 59, through channel 58 to channel 20, and in through channel 31 where it is discharged along with the liquid. When the tank is filled and aperture 57 is submerged, the vacuum created is increased, therefore increasing the vacuum in cup 16. The breather assembly, that is, breather member 56 and screw 60 are especially constructed to provide a large vacuum differential by utilizing the surface tension of the liquid. The concentric arrangement of screw 60 in tube 59 permits using an orifice having a greater sectional area than would be feasible with a single round orifice of comparable area. However, the radial distance from screw 60 to the inner wall of tube 59 is much less than the diameter of a comparable round orifice, and thereby presents a greater resistance to flow of the liquid than would be obtained in an open orifice of the same area. This does not, however, increase appreciably the resistance to flow of the air.

To further explain the function of screw 60 in tube 59, let us assume that the inside radius of tube 59 is $5/32''$ and the radius of that portion of the screw which projects into tube 59 is $4/32''$. According to simple algebra, a round hole having a comparable area through which fluid could flow would have a radius of $3/32''$. Now the surface tension of a liquid is described as the force exerted by a film per unit length of its boundary and is substantially constant for each fluid; therefore, the force or resistance of a liquid being pulled through tube 59 would be a function of the circumference of the inside of tube 59 plus the circumference of screw 60. On the other hand, the resistance to flow of liquid through a circular hole would be the function of the circumference of that hole. Again, by simple algebra, the sum of the circumferences of tube 59 and screw 60 is $9/16\pi$ inches while the circumference of a circular hole of the same cross-sectional area is $3/16\pi$ inches; therefore, it may be seen that in this instance the effective boundary length of tube 59 in screw 60 is three times the effective boundary length of a simple hole of similar cross-sectional area. Hence, generally speaking, it requires three times the amount of force to move liquid through tube 59 and around screw 60 as it would require to move liquid through the simple hole of identical cross-sectional area. Of course, the above example is by way of illustration and does not necessarily mean that the ratio of forces remains constant.

As the vacuum in chamber 19 increases, atmospheric pressure acting through hole 19 on the top of diaphragm 17 serves to overcome the internal hydraulic pressure on plunger 26, and the pressure of spring 28, and drives plunger 26 down, pressing ball 25 into the path of the liquid which seats it on valve seat 23 and shuts off the flow of the liquid. It should be understood that spring 28 is too weak to unseat ball 25 when the hydraulic pressure of the liquid is acting to seat the ball, even though diaphragm 17 and plunger 26 are no longer actuated since the vacuum is not maintained when the flow of liquid ceases; but, when the flow of liquid ceases, the vacuum is lost, and the hydraulic pressure within casing 10 will reseat plunger 26 and thus prevent leakage of liquid around the plunger.

When lever 54 is manually released, springs 43 and 44 seat washer 34, and the free end of retainer 35 pushes ball 25 off its seat and spring 22 returns it to the normal operating position shown in Fig. 1.

If the pressure of the liquid passing through the nozzle fails completely while the valve is in operation, spring 43 is sufficiently strong to close plug 32 and washer 34 and therefore will prevent the flexible hose from draining. If, on the other hand, the pressure of the liquid passing through the nozzle drops slightly, the pressure of spring 43 is sufficient to move plug 32 inward to restrict the area between plug 32 and cone 30 and to maintain the velocity of the liquid passing out cone 30, thus maintaining the vacuum.

It will be obvious to those skilled in the art that I have provided a nozzle of many advantages and great usefulness, and that many modifications and changes can be made in the embodiment shown and described without departing from the scope of my invention as defined in the appended claims.

I claim:

1. A nozzle for insertion into a container to be filled with liquid, comprising a valve housing having a liquid passage therethrough, a valve seat in said passage, a self-closing valve in said housing constructed and arranged to be opened by fluid pressure within said valve housing, main valve closing means urging said valve to closed position upon said seat, manual means operable to overcome said main valve closing means, said valve being operable to close on said seat even when said main valve closing means is overcome by said manual means, guard means adjacent said manual means provided with hanging means for hanging the nozzle on a support when not in use and means for locking said manual means in a plurality of operating positions, said guard means including safety means selectively operable to close said hanging means so as to prevent hanging the nozzle on a support when said manual means is locked in operating position.

2. A valve comprising a valve body having a fluid passage therethrough, a valve seat in said passage, a valve arranged to cooperate with said seat to control the flow of fluid through said passage, main and auxiliary valve closing means urging said valve to close position upon said seat, manual means operable to overcome said main valve closing means, said auxiliary valve closing means being constructed and arranged to retain said valve in closed position on said seat except when said auxiliary valve closing means is overcome by fluid pressure in said valve body, a second valve seat in said passage ahead of said first mentioned valve seat, a check valve arranged for selective seating upon said second valve seat, and means carried by said first mentioned valve for unseating said check valve.

3. A nozzle for insertion into a container to be filled with liquid, comprising a valve housing having a liquid passage therethrough, a valve seat in said passage, a self-closing valve in said housing, main valve closing means urging said valve to closed position upon said seat, manual means operable to overcome said main valve closing means, said valve being operable to close on said seat even when said main valve closing means is overcome by said manual means, a second valve seat in said passage ahead of said first mentioned valve seat, a check valve arranged for selective seating upon said second valve seat, means carried by said first mentioned valve for unseating said check valve, a plunger for moving said check valve, means pressing said check valve toward said plunger, a diaphragm for actuating said plunger, a chamber on said housing closed by said diaphragm, a connection from said chamber to the fluid passage whereby the flow of liquid through the housing will create vacuum on said diaphragm, and an air inlet located near the nozzle outlet and connected to relieve the vacuum on said diaphragm when open and to increase the vacuum on said diaphragm when closed by liquid filling said container, whereby the pressure of said diaphragm on said plunger when said air inlet is closed will actuate said plunger to move said check valve into position to be seated upon said second valve seat.

4. A nozzle for insertion into a container to be filled with liquid, comprising a valve housing having a liquid passage therethrough, a valve seat in said passage, a self-closing valve in said housing, main valve closing means urging said valve to closed position upon said seat, manual means operable to overcome said main valve closing means, said valve being operable to close on said seat even when said main valve closing means is overcome by said manual means, a second valve seat in said passage ahead of said first mentioned valve seat, a check valve arranged for selective seating upon said second valve seat, means carried by said first mentioned valve for unseating said check valve, a plunger for moving said check valve, means pressing said check valve toward said plunger, a diaphragm for actuating said plunger, a chamber on said housing closed by said diaphragm, a connection from said chamber to the fluid passage whereby the flow of liquid through the housing will create vacuum on said diaphragm, and an air inlet located near the nozzle outlet and comprising concentric walls defining an annular channel for the flow of air, said air inlet being connected to relieve the vacuum on said diaphragm when open and to increase the vacuum on said diaphragm when closed by liquid filling said container, whereby the pressure of said diaphragm on said plunger when said air inlet is closed will actuate said plunger to move said check valve into position to be seated upon said second valve seat.

5. In a nozzle for insertion into a container to be filled with liquid, comprising a valve housing having a liquid passage therethrough, a valve seat in said passage, a self-closing valve in said housing, main valve closing means urging said valve to closed position upon said seat, manual means operable to overcome said main valve closing means, said valve being operable to close on said seat even when said main valve closing means is overcome by said manual means, guard means adjacent said manual means provided with means for hanging the nozzle on a support when not in use and means for locking said manual means in a plurality of operating positions, said guard means including safety means to prevent hanging the nozzle on a support when said manual means is locked in operating position, a second valve seat in said passage ahead of said first mentioned valve seat, a ball check valve arranged for selective seating upon said second valve seat, means carried by said first mentioned valve for unseating said ball check valve, a plunger for moving said ball check valve, resilient means pressing said ball check valve toward said plunger, a diaphragm for actuating said plunger, a chamber on said housing closed by said diaphragm, a connection from said chamber to the fluid passage whereby the flow of liquid through the housing will create vacuum on said diaphragm, and an air inlet located near the nozzle outlet and connected to relieve the vacuum on said diaphragm when open and to increase the vacuum on said diaphragm when closed by liquid filling said container, whereby the pressure of said diaphragm on said plunger when said air inlet is closed will actuate said plunger to move said ball check valve into position to be seated upon said second valve seat.

6. A nozzle for insertion into a container to be filled with liquid, comprising a valve housing having a liquid passage therethrough, a valve seat in said passage, a self-closing valve in said housing constructed and arranged to be opened by fluid pressure within said valve housing, main valve closing means urging said valve to closed position upon said seat, manual means pivotally fixed to said housing and operable to overcome said main valve closing means, said valve being operable to close on said seat even when said main valve closing means is overcome by said manual means, guard means adjacent said manual means provided with hanging means for hanging the nozzle on a support when not in use and means for locking said manual means in a plurality of operating positions, said guard means including safety means selectively operable to close said hanging means so as to prevent hanging the nozzle on a support when said manual means is locked in operating position.

7. A nozzle for insertion into a container to be filled with liquid, comprising a valve housing having a liquid passage therethrough, a valve seat in said passage, a self-closing valve in said housing, manual means for opening said valve, actuator mechanism for closing said valve, said housing having channel means connected to said actuator mechanism for creating a vacuum, said actuator mechanism being responsive to an increase in said vacuum to close said valve, said channel means having an orifice adjacent the discharge end of said housing, and restriction means projecting concentrically into said orifice, said restriction means and said orifice providing resistance to the flow of liquid therebetween thus to increase the vacuum in said channel means when liquid enters said orifice.

8. In a nozzle for insertion into a container to be filled having manual means for opening said nozzle and vacuum operated means for closing said nozzle upon an increase in vacuum, the combination therewith of a channel means from said vacuum operated means and provided with an orifice, and restriction means within said orifice, said restriction means providing additional cross-sectional boundary, said restriction means and said orifice providing a resistance to flow of liquid therebetween thus to increase the vacuum in said vacuum operated means when liquid enters said orifice.

9. The structure as claimed in claim 8 wherein said restriction means comprises a cylindrical member substantially concentrically arranged within said orifice.

References Cited in the file of this patent
UNITED STATES PATENTS

| Number | Name | Date |
|---|---|---|
| 2,129,770 | Johnsen | Sept. 13, 1938 |
| 2,227,578 | Fraser | Jan. 7, 1941 |
| 2,528,747 | Gravelle | Nov. 7, 1950 |